United States Patent
Shah

(10) Patent No.: US 12,547,426 B2
(45) Date of Patent: Feb. 10, 2026

(54) PLUG-IN SELECTION IN VIRTUAL ASSISTANT PLATFORMS

(71) Applicant: Microsoft Technology Licensing, LLC, Redmond, WA (US)

(72) Inventor: Sanket Rajiv Shah, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 18/731,037

(22) Filed: May 31, 2024

(65) Prior Publication Data
US 2025/0370769 A1  Dec. 4, 2025

(51) Int. Cl.
G06F 15/16 (2006.01)
G06F 9/445 (2018.01)
G06F 9/451 (2018.01)

(52) U.S. Cl.
CPC .......... *G06F 9/44526* (2013.01); *G06F 9/451* (2018.02)

(58) Field of Classification Search
None
See application file for complete search history.

(56) References Cited

U.S. PATENT DOCUMENTS

| | | |
|---|---|---|
| 11,507,862 B2 | 11/2022 | Mitchell |
| 2022/0165360 A1* | 5/2022 | Lee ................. G06N 3/0495 |
| 2023/0062931 A1* | 3/2023 | Arzani ................. G06N 20/00 |
| 2023/0072423 A1* | 3/2023 | Osborn ................. G16H 20/30 |
| 2023/0162018 A1 | 5/2023 | Yang |
| 2023/0394391 A1 | 12/2023 | Gandhi |
| 2023/0419027 A1 | 12/2023 | Pang |
| 2024/0104506 A1 | 3/2024 | Wu |
| 2025/0095302 A1* | 3/2025 | Wetmore ................. G06F 3/013 |
| 2025/0131289 A1* | 4/2025 | Larson ................. G06N 5/02 |
| 2025/0209063 A1* | 6/2025 | Jellen ................. G06F 16/3328 |

OTHER PUBLICATIONS

McInnes, et al., "Umap: Uniform manifold approximation and projection for dimension reduction.", arXiv preprint arXiv:1802.03426, Sep. 18, 2020, pp. 1-63.

Puerto, et al., "UKP-SQUARE v3: A Platform for Multi-Agent QA Research.", arXiv preprint arXiv:2303.18120, May 2023, 12 Pages.

(Continued)

*Primary Examiner* — Phuoc H Nguyen

(74) *Attorney, Agent, or Firm* — Schwegman Lundberg & Woessner, P.A.

(57) ABSTRACT

In virtual assistant platforms that provide access to a plurality of plug-ins, plug-in selection based on comparisons between high-dimensional embeddings of user prompts and high-dimensional embeddings of the example prompts contained in plug-in definitions can cause "collisions"—that is, selection of the wrong plug-ins—if the plug-in-definitions of the intended and erroneously selected plug-ins are too similar. Debugging such collisions or avoiding them in the first place can be aided by visualizing the example prompts of multiple plug-ins, optionally along with the user prompts, in a scatter plot based on mappings of the high-dimensional embeddings onto lower-dimensional vector representations, and analyzing changes in the scatter plot responsive to modifications of the plug-in definitions.

20 Claims, 9 Drawing Sheets

(56) References Cited

OTHER PUBLICATIONS

Sachdeva, et al., "UKP-SQUARE v2: Explainability and Adversarial Attacks for Trustworthy QA.", arXiv preprint arXiv:2208.09316, Oct. 20, 2022, 11 Pages.

Shen, et al., "Do Anything Now: Characterizing and Evaluating In-The-Wild Jailbreak Prompts on Large Language Models", arXiv preprint arXiv:2308.03825, Aug. 7, 2023, pp. 1-19.

Wu, et al., "Usable xai: 10 strategies towards exploiting explainability in the llm era.", arXiv preprint arXiv:2403.08946, Mar. 13, 2024, pp. 1-56.

Zhang, et al., "Bootstrap Your Own Skills: Learning to Solve New Tasks with LLM Guidance", GitHub, Retrieved From: https://clvrai.github.io/boss/, 2023, 24 Pages.

Zhao, et al., "Explainability for large language models: A survey.", ACM Transactions on Intelligent Systems and Technology, vol. 15, No. 2, Feb. 2024, pp. 1-38.

\* cited by examiner

PLUG-IN SELECTION IN VIRTUAL ASSISTANT PLATFORMS

BACKGROUND

With advances in artificial intelligence (AI), AI-based software has become a powerful tool for increasing human productivity. Virtual assistants, sometimes referred to as "copilots," can use generative AI to perform a wide range of tasks responsive to user prompts, including, for example, gathering and summarizing information, creating images, music, or program code, or automating workflows. Virtual assistant platforms often integrate a generative AI model having general capabilities with a number of plug-ins that provide task-specific program functions, sometimes called "skills." Some virtual assistant platforms include hundreds or thousands of plug-ins, along with the capability to select, from among them, the plug-in(s) that are most suited to accomplish the user's goals or tasks as reflected in a given user prompt. Plug-in selection generally involves matching the user prompt, or the user goals or tasks derived therefrom, to computational representations of the plug-ins determined from natural-language plug-in definitions. When different plug-ins have similar definitions, "collisions" can occur, which impacts the accuracy of plug-in selection.

BRIEF DESCRIPTION OF DRAWINGS

Described herein are systems and methods for computing and visualizing collisions between plug-ins, or skills, in a virtual assistant platform, and for revising and refining plug-in definitions to reduce collisions and improve plug-in selection.

DESCRIPTION

Figure 1:
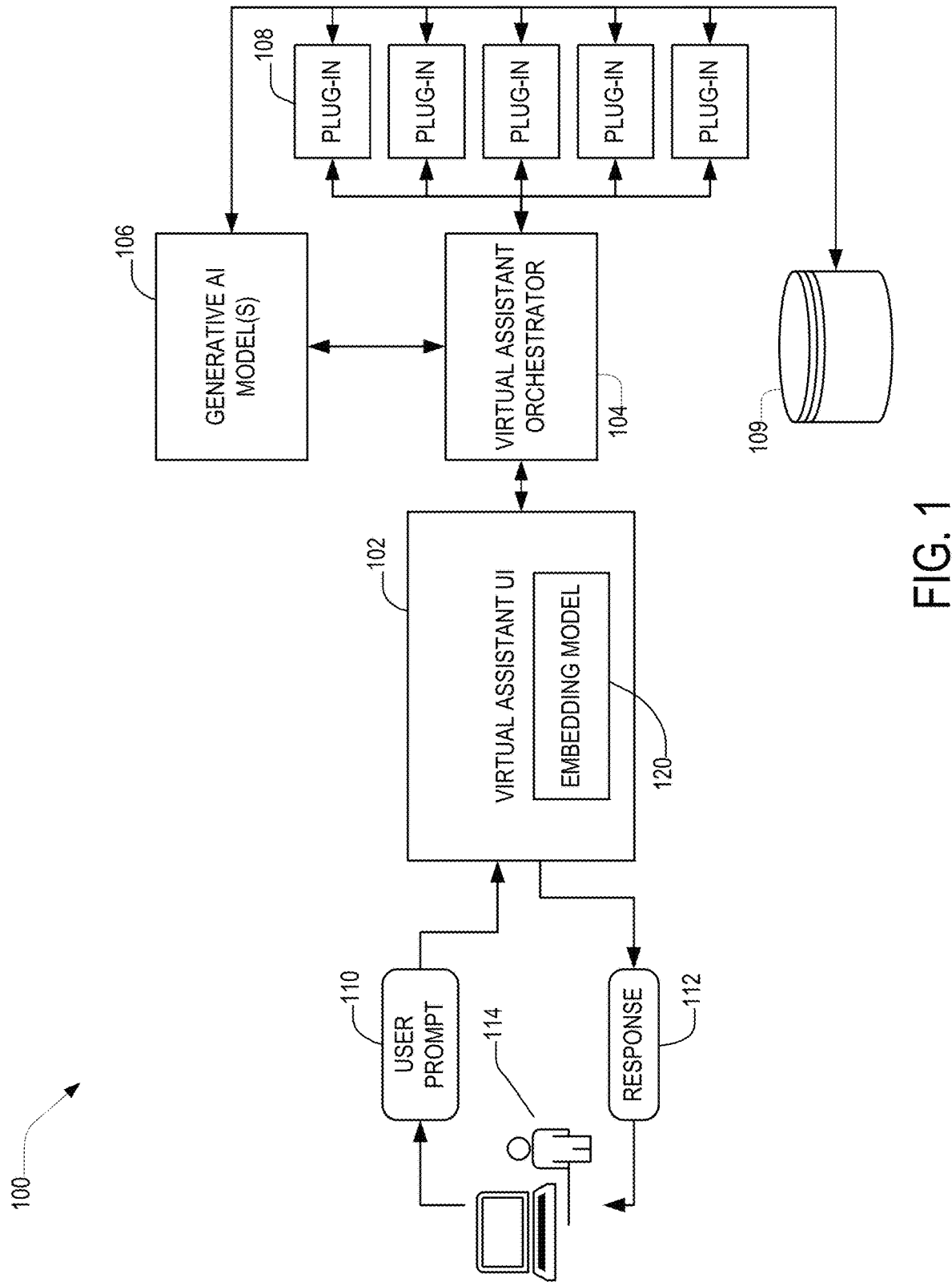
FIG. 1 is a block diagram of an example virtual assistant platform, in accordance with various embodiments.

This disclosure pertains to plug-in selection in a virtual assistant platform. As understood herein, a "virtual assistant platform" is a set of computer-implemented tools that combine content-generating capability provided by one or more generative AI models (or, synonymously, machine-learning (ML) models) with task-specific program functions provided by plug-ins to perform advanced computational functions responsive to prompts received from a user. For the user, the virtual assistant platform may create the experience of an assistant or copilot that enhances productivity through collaboration or co-creation, or simply as a (virtual) companion. Virtual assistant platforms can find application in many domains, including search, creative content generation, network security, and software development, to name just a few examples. Hereinafter, a virtual assistant platform is also referred to as a "platform" or "virtual assistant."

Plug-in selection in virtual assistants is often based on plug-in definitions that include, in addition to a description, a number of example prompts specifying tasks of the type which the plug-in is intended to perform. An embedding model can generate high-dimensional embeddings from these example prompts to serve for comparisons with high-dimensional embedding vectors generated with the same model from user prompts received by the platform. This allows plug-ins to be selected for a given prompt based on similarity of their associated embedding vectors to that of the user prompt. Sometimes collisions occur, meaning that the wrong plug-in is selected for a user prompt. Such collisions can result, for instance, from overlapping definitions between the example prompts for different plug-ins, or from a set of example prompts that does not adequately cover the range of user prompts for which a given plug-in should be called. While such problems can often be cured in principle by revising the plug-in definitions, determining the root cause of the problem, such as identifying which example prompts are responsible for the collisions and how they could be modified to avoid collisions, is not a trivial task, both because the high-dimensional embedding space does not afford any intuition to human developers and because the iterative revision and testing of plug-in definitions is a time-consuming process.

In various embodiments, this difficulty is addressed by mapping the high-dimensional embeddings of the example prompts and/or user prompts onto two- or three-dimensional vector representations, which lend themselves to visualization, e.g., in the form of a scatter plot. Analyzing the scatter plot (or similar user interface), whether manually or with the help of programmatic or ML-based tools, allows drilling down to the cause of a collision. In some embodiments, the user interface further provides, or is integrated with, functionality for modifying the skill definitions, e.g., by deleting, adding, or modifying example prompts. This functionality may be provided via convenient user interactions with the data displayed in the user interface, and may be augmented by automated or semi-automated suggestions for changes. The changes to the plug-in definitions may be automatically propagated to update the embedding vectors, two- or three-dimensional vector representations, and scatter plot. This provides for increased speed and efficiency in iteratively revising and testing plug-in definitions, ultimately contributing to improved plug-in selection.

FIG. 1 is a block diagram of an example virtual assistant platform 100, in accordance with various embodiments. The platform 100 includes a number of computational components implemented by a suitable combination of computing hardware and software, such as software programs stored in memory and executed by one or more general-purpose processors, optionally assisted by one or more hardware accelerators configured to perform specific program functions. As shown, the components of the platform 100 include a virtual assistant user interface (UI) 102 at the front end, which interacts, via a virtual assistant orchestrator 104 (herein also "orchestrator"), with one or more generative AI models 106 (herein also "generative AI" or "AI model(s)") and a set of plug-ins 108 at the back end. The plug-ins 108, in turn, may access various data sources 109, e.g., a database or the world wide web. As used herein, the term "plug-in" includes both built-in program functions provided by the platform developer as part of the initial platform 100 as well as additional program functions provided by third parties; both types of plug-ins may be connected to the orchestrator via application programming interfaces (APIs).

The UI 102 is configured to receive user prompts 110 and return respective responses 112 to the user 114; as such, the UI 102 provides the user experience of the virtual assistant 100. Depending on the application context and purpose of the virtual assistant 100, the prompts 110 and responses 112 may be provided in various input and output modalities and formats, including, for example and without limitation, text or audio representing natural language, images or video, music, program code, structured or unstructured data, and combinations of the foregoing. The platform 100 may, for example, implement a chatbot that takes natural-language input as prompts 110 and provides natural-language output as the responses 112, mimicking human conversation through text or voice interactions. Alternatively or additionally, the platform may output creative content (such as graphics, images, video, or music) responsive, for instance, to natural-language prompts, optionally in conjunction with example image or audio input provided by the user. As yet another example, in the context of a network security suite, the platform 100 may interact with the user via text and/or graphics to filter, aggregate, summarize, and visualize security data responsive to user input. Or, within a software development suite, the virtual assistant 100 may take general descriptions of program functionality as input, and output suitable program code. Many other example applications will occur to those of ordinary skill in the art.

The generative AI 106 aids in the processing of the user prompts 110 and generation of content for the responses 112. For example, the generative AI 106 may be or include a large language model (LLM) trained to process and generate language input and output, such as, e.g., a generative pre-trained transformer (GPT) model. The LLM may also support other input/output modalities, such as images, audio, video, audio, sensor data, synthetic data, or other types of data. Alternatively or additionally, the generative AI model(s) 106 may include one or more generative models specific to such other input/output modalities, such as, e.g., a vision transformer (ViT) model. Regardless of the type of data input and output, the generative AI 106 may be implemented by models trained on large datasets (e.g., LLMs) or models trained on smaller datasets (e.g., small language models (SLMs). Further, the generative AI 106 may include one or more foundation models, specialized models, or a combination of both. A foundation model is a generic machine-learning model that has been trained on a broad, varied set of data to perform a wide range of tasks, whereas a specialized model is a model trained on a narrower data set to perform domain-specific functions. An LLM, for example, may be trained on a large corpus of documents of varied contents, such as a random sampling of web sites, to serve as a foundation model. On the other hand, to obtain an LLM specifically for generating program source code, the LLM may be trained on a corpus dominated by code samples. A specialized model may be derived from a foundation model by further training on domain-specific training data. Generative AI, including LLMs, SLMs, ViTs, and others are generally based on deep neural network architectures, such as generative adversarial networks, transformers, or variational encoders, among other complex architectures. The AI model(s) 106 may be trained using known training algorithms, e.g., backpropagation of errors with stochastic gradient descent. Upon completion of training, the AI model itself no longer changes. Thus, while it may be capable of processing and generating a wide range of content, the trained model cannot, in general, take new and current information into account.

The plug-ins 108 augment the general capabilities of the generative AI model(s) 106 with custom functions. In particular, plug-ins 108 may provide the ability to base responses 112 to the user prompts 110 on current information available in the data sources 109 they can access. For instance, a search plug-in may perform an internet search, entailing the possibility of retrieving more recent search results that were not available when the AI model(s) were trained. Or, to illustrate a more domain-specific function, a weather plug-in may access a source of current weather data, such as an online weather service, or sensors connected to the plug-in via the internet or another communications network. As yet another example, within an enterprise, a plug-in may be configured to access up-to-date data recorded by the enterprise, such as security data. In contrast to the generative model(s) 106, the functionality of the plug-ins 108 is usually explicitly programmed. However, when processing queries (as derived from user prompts 110), the plug-ins 108 may execute calls to the generative AI 106, and use the output of the generative AI 106 in constructing their responses.

The orchestrator 104, generative AI 106, and plug-ins 108 may interact in complex ways. In general, upon receipt of a user prompt 110, the orchestrator 104, optionally assisted by the AI model(s) 106, ascertains the user's intent, and then determines which of a set of available plug-ins 108 is or are best suited to achieve that intent. In some embodiments, the selection of plug-ins is made among a large number, e.g., hundreds or thousands, of plug-ins. The determination of user intent may entails breaking down the prompt 110 into multiple sub-prompts, e.g., in a hierarchy where the prompt is first broken down into multiple goals (or intents), and each goal is then further broken down into specific tasks. The sub-prompts associated with the individual tasks are than mapped onto plug-ins that provide the intended skill. To map prompts or sub-prompts onto plug-ins, the orchestrator 104 may utilize an embedding model 120 that receives and operates on the prompt or sub-prompts in its native format (e.g., text) to generate a large-dimensional embedding vector. A non-limiting example implementation of the embedding model 120 is the Open AI model text-embedding-ada-002, which converts natural-language text to 1536-dimensional vectors. The embedding vector computed from a given prompt (or sub-prompt) can be compared against embedding vectors previously computed for the various plug-ins based on associated plug-in definitions (also "skill definitions") to determine the degree of similarity, e.g., in terms of the cosine similarity (that is, the scalar product normalized by the absolute values of both vectors), Euclidean distance (that is, the square root of the sum of squares of the component-wise differences) or another suitable similarity metric. Based on the similarity of the embedding vectors, the orchestrator 104, e.g., using a vector search algorithm, can identify plug-ins with embedding vectors similar to that of the prompt (or sub-prompt), and select them to perform the associated task. An example suitable vector search algorithm is Hierarchical Navigable Small Worlds (HNSW), which uses cosine similarity at its core.

A plug-in generally takes a number of input parameters, corresponding to "slots." The orchestrator 104 maps implicit constraints in the prompt 110 to parameter values to fill these slots when calling the selected plug-in(s) 108. In some embodiments, the orchestrator 104 utilizes the AI model(s) 106 in analyzing the prompt 110 to determine the parameter values to be passed on to the plug-ins 108. Execution of the plug-ins 108, in turn, may involve retrieving relevant data from selected data sources 109, as well as, in some cases, making calls to the AI model(s) 106 to process the retrieved data. The plug-ins 108 return their outputs to the orchestrator 104, which merges, filters, and ranks the outputs of different plug-ins 108 to generate a single response 112 to be provided to the user 114 via the virtual assistant UI 102.

Figure 2A:
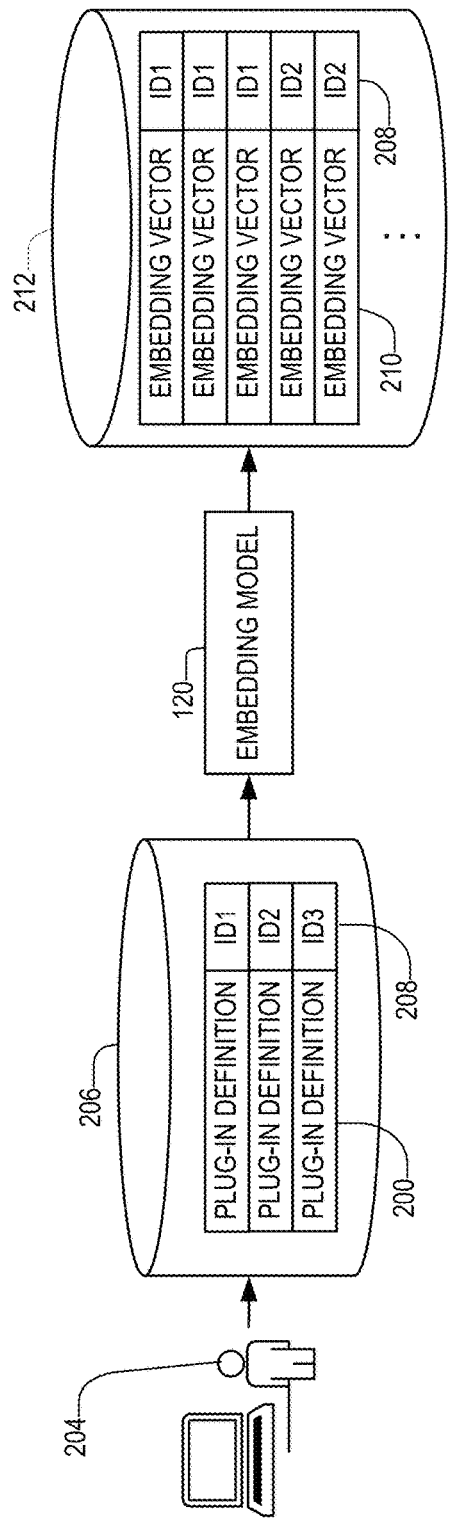
FIG. 2A is a block diagram illustrating the creation of embedding vectors for plug-ins based on associated plug-in definitions, in accordance with various embodiments.

FIG. 2A is a block diagram illustrating the creation of embedding vectors for plug-ins based on associated plug-in definitions, in accordance with various embodiments. Plug-in definition and embedding take place before the plug-in is published to, or deployed in, the virtual assistant platform 100, usually in a developer environment isolated from the platform 100. The definition 200 of a plug-in generally includes a plug-in description that characterizes the provided skill or function in general terms, along with a number of example prompts representing tasks for which the plug-in is intended. Two illustrative example plug-in definitions are provided in the following table:

| Plug-in description | Example prompts |
| --- | --- |
| Get a summary of the given text | Summarize this<br>What is the summary<br>Give me the summary of |
| Analyzes and interprets command line inputs, bash script, powershell script, shell script, or other type of code, command, script to natural language. | Analyze the following code<br>Explain the following command<br>What does this script do?<br>What actions are performed by this code?<br>Explain this shell command |

The plug-in definitions 200 are usually created manually by a human user 204, e.g., the plug-in developer, although machine-learning tools may also be used to create or assist with creating the definitions, as will be described later. The plug-in definitions 200 are stored in a suitable data structure, such as in a plug-in definitions database 206. Each plug-in definition is stored along with a unique identifier 208 of the associated plug-in itself, and optionally an address of the location in data storage where the plug-in (e.g., its source code or executable) can be found. The plug-in descriptions and example prompts of the plug-in definitions 200 are individually fed as inputs into the embedding model 120—that is, an instance of the same model as is used by the orchestrator 104 in plug-in selection—to generate high-dimensional embedding vectors 210, one for each description and one for each sample prompt. The embedding vectors 210 for each plug-in are stored, along with the plug-in identifier 208 and/or address, in a plug-in embeddings database 212 or similar suitable data structure. In some embodiments, the plug-in definitions 200 and embedding vectors 210 are stored together in a single database (selected portions (e.g., set of columns) of which then constitute the databases 206, 212).

Figure 2B:
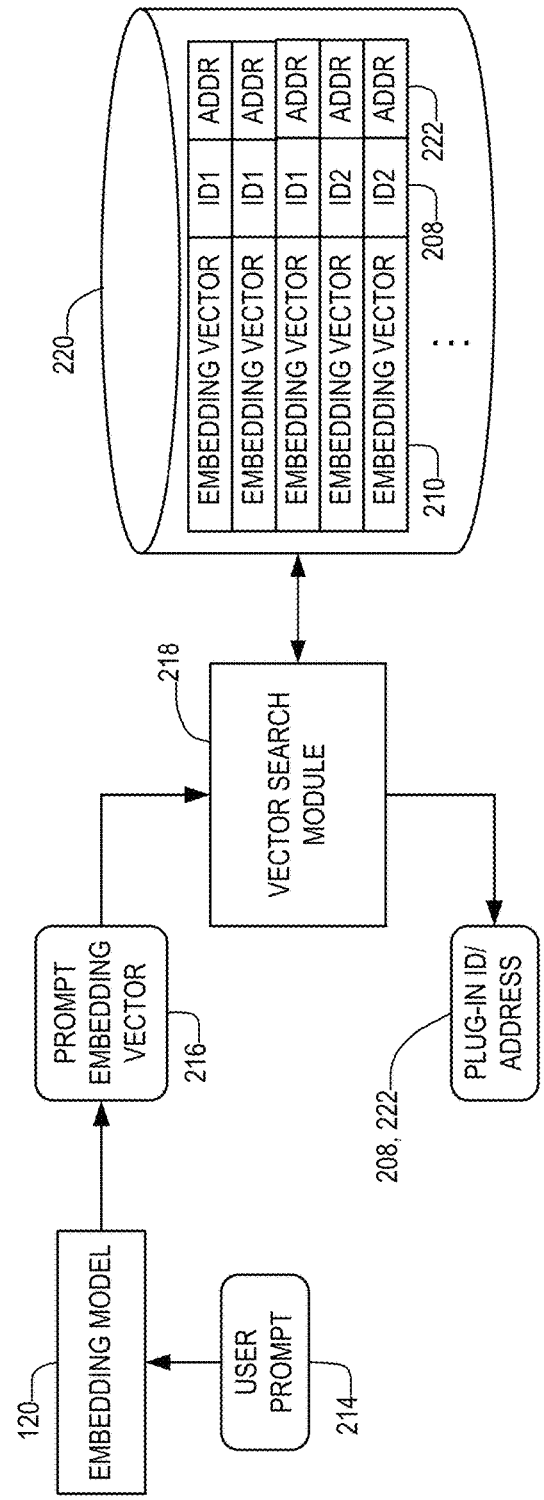
FIG. 2B is a block diagram illustrating plug-in selection based on embedding vectors of the plug-ins within the virtual assistant platform once the plug-ins have been published, in accordance with various embodiments.

FIG. 2B is a block diagram illustrating plug-in selection based on embedding vectors 210 of the plug-ins within the virtual assistant platform 100 once the plug-ins have been published, in accordance with various embodiments. As explained with reference to FIG. 1, plug-in selection may be implemented as a capability of the orchestrator 104. To select suitable plug-ins for a given user prompt 214, the prompt 214 is input into the embedding model 120 to create a prompt embedding vector 216. Note that this user prompt 214 may be the original user prompt 110 if sufficiently simple, or a sub-prompt derived from the original user prompt 110 based on the above-described analysis of goals/intents and tasks. The prompt embedding vector 216 is utilized by a vector search module 218 to query a plug-in embeddings database 220 (e.g., database 212 or a copy thereof) or similar data structure storing the previously computed plug-in embedding vectors 210 along with the associated unique identifiers 208 and/or addresses 222 of (or pointers to) the locations in data storage or memory where the plug-ins reside. (Note that the locations of the plug-ins in the deployed platform 100 may differ from those in the development environment, and accordingly, the addresses 222 in the embeddings database 220 accessed by the vector search module may differ from addresses stored in the plug-in definitions or embeddings databases 206, 212.) The vector search module 218 identifies those among the stored plug-in embedding vectors 210 that are similar to the prompt embedding vector 216, and returns their associated plug-in identifiers 208 or addresses 222, which allows the orchestrator to then call the selected plug-ins. In using embeddings vectors of the prompt 214 and plug-ins 108, the described plug-in selection process bases the selection or short-listing and ranking of plug-ins on the semantic meaning of the prompt 214 as compared with the plug-in definitions.

With a large number of plug-ins, it can happen that a prompt 214 is matched to a plug-in that was not intended; this situation is sometimes referred to as "prompt collision." Prompt collisions can result, for example, from overlap between the sets of plug-in embedding vectors associated with different plug-ins, reflecting overlap between the definitions 200 of the different plug-ins, e.g., in their example prompts. Conversely, prompt collision can also result from an incomplete set of plug-in embedding vectors, due to a plug-in definitions that is not sufficiently comprehensive, as the plug-in may fail to be matched to prompts for which it was intended, allowing non-intended plug-ins to be matched to the prompt instead. Accordingly, prompt collisions can be ameliorated, that is, the risk of future prompt collisions can be reduced, by revising the plug-in definitions (e.g., by adding, revising, or deleting example prompts or revising the plug-in description) and updating the corresponding plug-in embedding vectors. The embedding vectors, however, are high-dimensional representations of the plug-in descriptions and example prompts that machines and models can operate on, but which are too complex to understand by humans. Thus, for humans, plug-in selection based on embedding vectors is like a "black box," and provides little guidance for revising prompt definitions.

In accordance with various embodiments, to render plug-in selection more "explainable" to a human and thereby help solve prompt collision problems, dimension reduction is utilized. Dimension reduction is a technique that reduced the number of dimensions in a dataset while preserving much of the information contained in the data. In accordance herewith, a dimension reduction technique is used to map the high-dimensional embedding vectors (e.g., vectors with more than 1500 dimensions) onto lower-dimensional vector representations, in particular, in some embodiments, two- or three-dimensional vector representations, which facilitate visualizing plug-ins in a user interface as scatter plots. A technique for dimension reduction that has been found to work well for this purpose is Uniform Manifold Approximation and Projection for Dimension Reduction (UMAP), proposed by Leland McInnes, John Healy, and James Melville in a publication on arXiv (1802.03426v3), which is incorporated herein by reference. A software implementation of UMAP is available, e.g., in the Python library. UMAP includes a number of parameters that can be tuned and selected specifically to suit the application. While UMAP is particularly adept at preserving the high-dimensional initial problem space and spatial relations between the embeddings when projecting the space to two (or three) dimensions, other dimension reduction techniques (such as, e.g., t-SNE or Stochastic Neighbor Embedding (neurips.cc)) may also be used alternatively.

Figure 3:
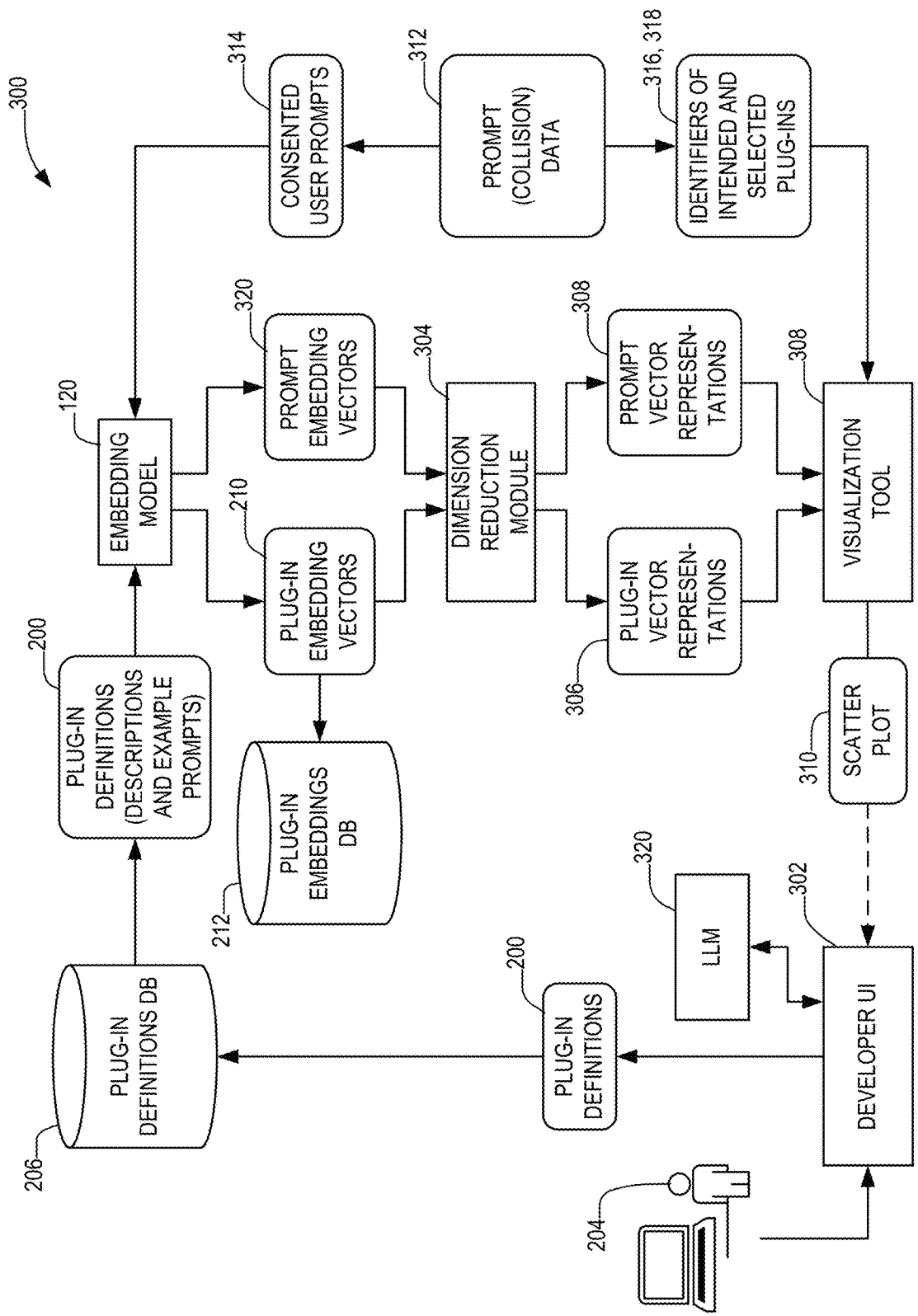
FIG. 3 is a block diagram illustrating a system for iteratively defining plug-ins and visualizing their embedding vectors, in accordance with various embodiments.

FIG. 3 is a block diagram illustrating a system 300 for iteratively defining plug-ins and visualizing their embedding vectors, in accordance with various embodiments. The system 300 incorporates components for plug-in definition and embedding as discussed with reference to FIG. 2A, and augments them with tools for visualization and refining plug-in definitions. As shown, the system 300 includes a user interface 302 (herein also "developer UI," to indicate its use within a developer environment and differentiate it from the virtual assistant UI 102) through which a user 204 can initially enter and/or subsequently revise (e.g., augment or edit) plug-in definitions 200, e.g., within a text editor field. As the plug-in definitions 200 are entered or modified, they are recorded in the plug-in definitions database 206, as well as passed to the embedding model 120 to compute or update associated plug-in embedding vectors 210. The system 300 further includes a dimension reduction module 304, e.g., implementing UMAP, that maps the high-dimensional embedding vectors 210 onto two- or three-dimensional vector representations 306. A visualization tool 308 creates a user interface showing a scatter plot 310 of these vector representations 306, where each plug-in description or example prompt is visually represented by a data point whose position in a two- or three-dimensional coordinate system reflects the two- or three-dimensional vector representation 306. The association of the various data points with the various plug-ins may be visually encoded, e.g., in the color or symbol type of the data point. A non-limiting example of a suitable, readily available visualization tool is the plotting library Matplotlib for Python. In some embodiments, the visualization tool 308 is integrated with the developer UI 302, e.g., to display the scatter plot 310 and the text editor field alongside each other, or to present them in separate windows or tabs of the same application and allowing easy switching between them. Alternatively, the scatter plot 310 may be displayed in a user interface associated with the visualization tool 308.

Figure 4:
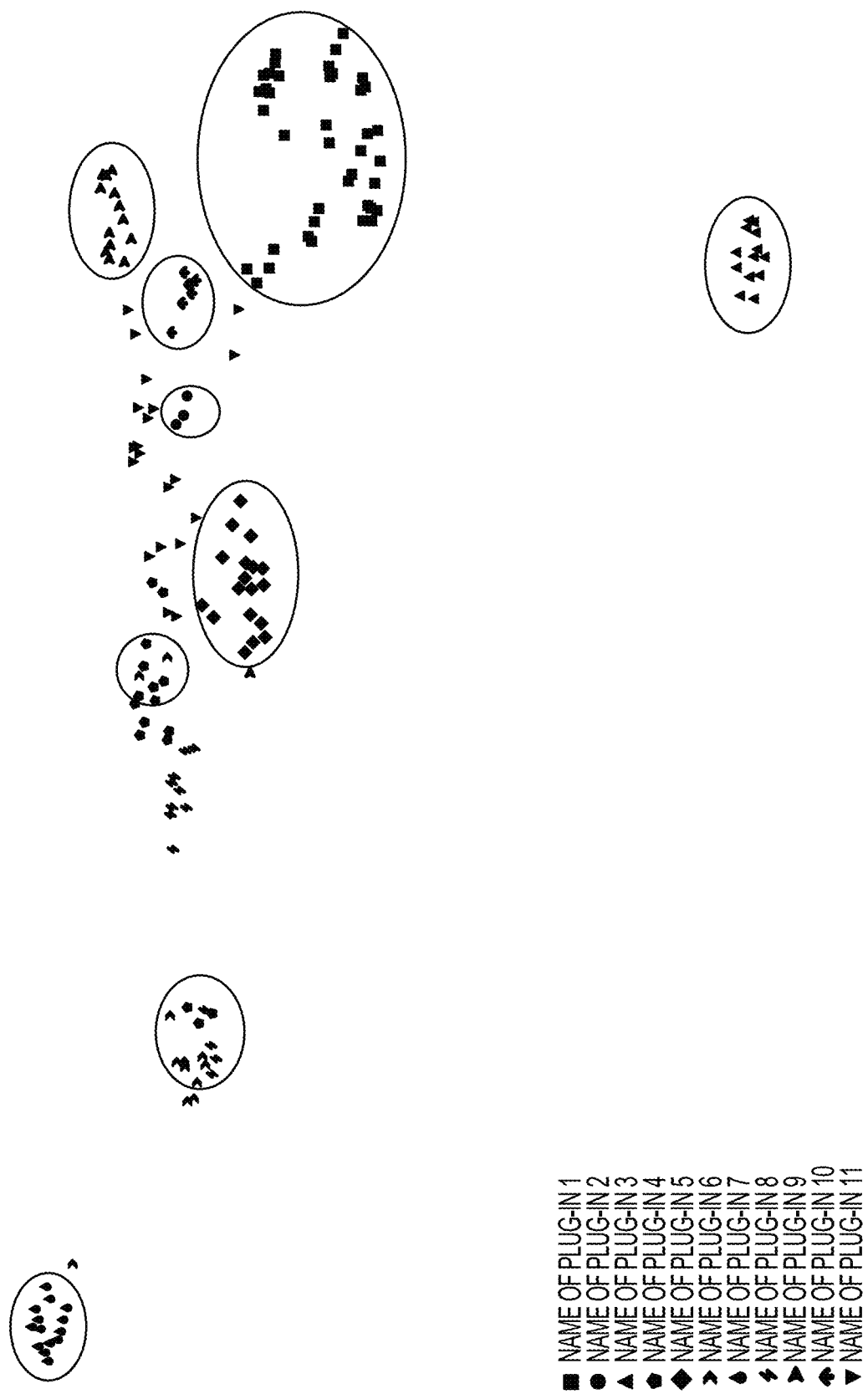
FIG. 4 depicts an example scatter plot of two-dimensional vector representations of the descriptions and example prompts associated with multiple plug-ins.

FIG. 4 depicts an example scatter plot of two-dimensional vector representations of the descriptions and example prompts associated with multiple plug-ins, as may be created with the visualization tool 308 of FIG. 3. The symbolic representations of the data points differ in their visual attributes—such as symbol shape, color, fill type or pattern, size, or others—between different plug-ins to which they belong, and shared the same visual attributes among all data points associated with the same plug-in. In the depicted example, data points for eleven different plug-ins are encoded with eleven different respective symbol types; as symbolically indicated, a legend listing the names of the plug-ins may be included with the scatter plot. As can be seen, most data points associated with a given plug-in are spatially clustered together (as indicated by oval frames added to the scatter plot), signifying that their respective two-dimensional vector representations are similar. However, for a few plug-ins (e.g., represented by downward-pointing triangles or pentagons), the data points fall into multiple clusters, with clusters of different plug-ins overlapping with each other. Also, for one of the plug-ins (represented by arrowheads pointing to the right), the data points include an outlier that is far away from the cluster of the other data points.

Returning to FIG. 3, the visualization of plug-ins and their embeddings based on dimension reduction can be used not only prior to publishing of the plug-ins to predict or anticipate where collisions may occur, but also post-publishing to debug the plug-in selection based on actual collisions observed during use of the virtual assistant platform 100, or simply to compare the prompts received from users against the definitions of the respective intended plug-ins. For this purpose, the system 300 may receive prompt (collision) data 312, including user prompts 314 (e.g., original user prompts or sub-prompts derived therefrom) that were submitted to the platform 100 along with the names or other identifiers 316 of the intended plug-ins and, in the case of prompt collision data, the names or other identifiers 318 of the plug-ins that were in fact selected. The user prompts 314 are fed into the embedding model 120 to create prompt embedding vectors 319, which can then be mapped, with the dimension reduction module 304, onto two- or three-dimensional vector representations 322. The vector representations 322 of the prompts 314 and the associated names or other identifiers 316, 318 of the intended and selected plug-ins are passed to the visualization tool 308, where the vector representations 322 of the prompts can be visualized in the scatter plot 310 along with the vector representations 306 of the plug-ins, using different visual attributes to distinguish between the two.

Figure 5:
FIG. 5 depicts an example scatter plot of two-dimensional vector representations of both user prompts received from users of a virtual assistant platform and the descriptions and example prompts associated with the intended plug-ins.

FIG. 5 depicts an example scatter plot (as may be created with the visualization tool 308 of FIG. 3) of two-dimensional vector representations of both user prompts received from users of a virtual assistant platform 100 and the descriptions and example prompts associated with the intended plug-ins. Herein, the vector representations associated with descriptions and example prompts of the plug-ins are depicted as hollow symbols, and the vector representations of the users prompts are shown as solid symbols. Different symbol shapes indicate different plug-ins. As can be seen, there is generally good overlap between the vector representations of user prompts and of the sample prompts and descriptions of the intended plug-ins. However, there are also user prompts whose vector representations are clustered in regions not covered by example prompts, suggesting that the example prompts of the plug-in definition does not adequately cover the range of relevant prompts.

Figure 6:
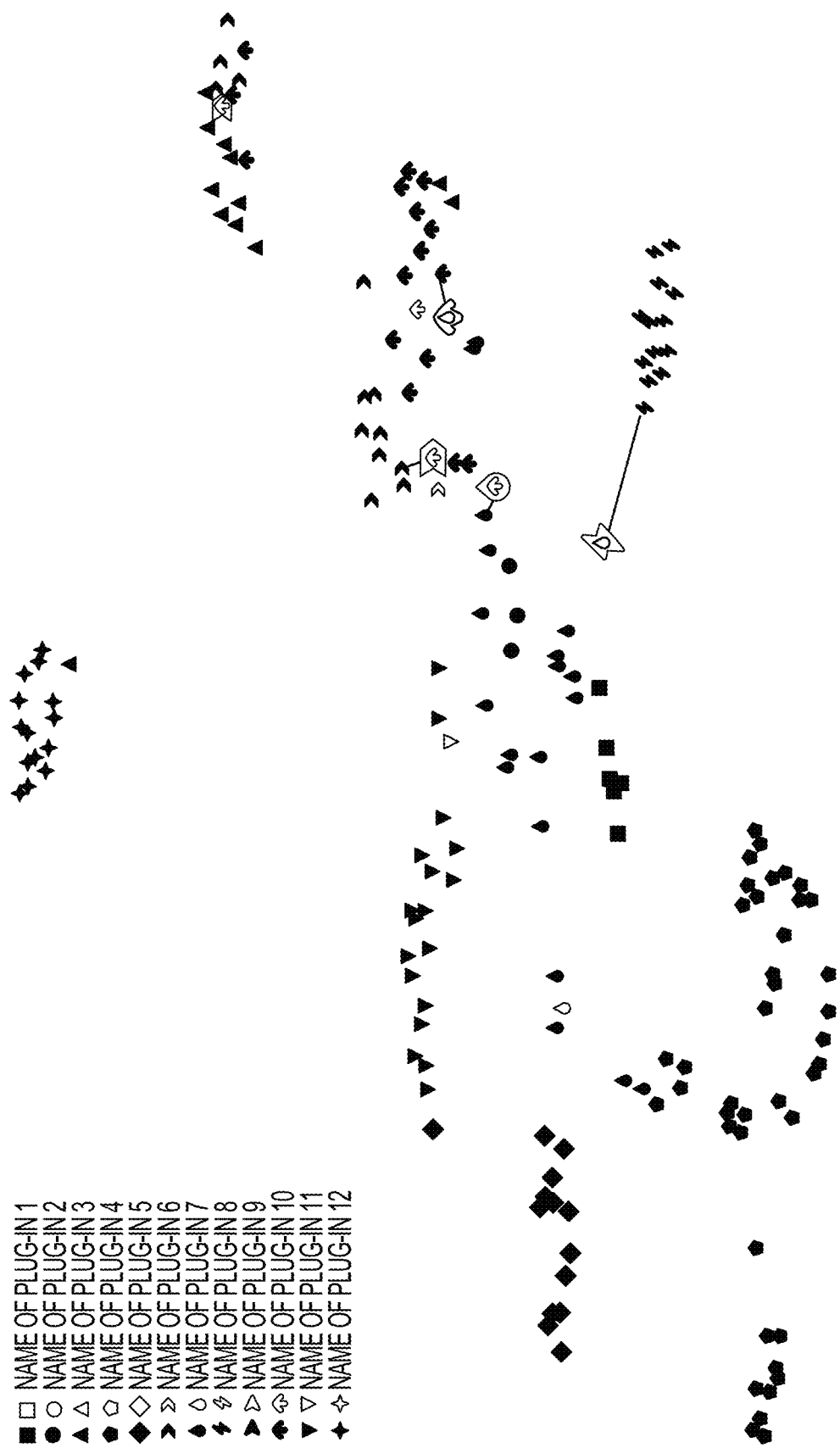
FIG. 6 depicts an example scatter plot of two-dimensional vector representations of user prompts from collision data and of the descriptions and example prompts associated with both the intended and the actually selected plug-ins.

FIG. 6 depicts an example scatter plot (as may be created with the visualization tool 308 of FIG. 3) of two-dimensional vector representations of user prompts from collision data and of the descriptions and example prompts associated with both the intended and the actually selected plug-ins. Herein, the vector representations associated with descriptions and example prompts of the plug-ins are depicted as hollow symbols, and the vector representations of the users prompts are shown as solid symbols. Different symbol shapes indicate different plug-ins. The shape of the solid symbols corresponds to the respective intended plug-in; the solid symbols are surrounded by a larger shape corresponding to the selected plug-in. As can be seen, the data points of certain user prompts are closer to data points of plug-ins that are not intended than to those of the intended plug-in, or fall in regions where the data points of multiple plug-ins overlap, resulting in collisions. Visualizing user prompts and plug-ins in the scatter plot provides a quick and intuitive way for a user to investigate and identify the source of the problem as well as devise a general solution. For instance, if a user prompt falls between the clusters of data points associated with the intended and selected plug-in, but closer to the un-intended selected plug-in, the problem can be addressed by adding example prompts to the definition of the intended plug-in, deleting example prompts from the un-intended plug-in, modifying example prompts for either plug-in to cause the data point to shift, or some combination of the foregoing.

As will be appreciated by those of ordinary skill in the art, the particular choice of visual attributes used in FIGS. 4-6 to indicate different plug-ins and differentiate between example prompts and descriptions on the one hand and user prompts on the other hand, as well as between intended and selected skills for a user prompt, is but one among multiple possibilities. Instead of using different symbol shapes, for instance, different colors may be used to encode the different plug-ins. The example prompts and descriptions of the plug-ins may then all be depicted with the same symbol (e.g., a dot or circle), and the prompts may be shown with another symbol (e.g., an x). The color of the prompt symbol may be chosen to indicate the intended plug-in, and the color of a circle surrounding the prompt symbol may be used to indicate the selected plug-in.

With renewed reference to FIG. 3, scatter plots such as the ones shown in FIGS. 4-6 may assist a user 204 in revising plug-in definitions to avoid overlap between the embedding vectors and data points associated with different plug-ins prior to publishing, or to solve prompt collisions when they occur. In general, this process is iterative. After the user 204, based on the visualization of the embeddings in the scatter plot 310, has changed one or more plug-in definitions 200 by adding, deleting, or editing one or more example prompts or editing one or more plug-in descriptions, new and updated embedding vectors 210 for the example prompts and descriptions are automatically computed, the updated embedding vectors are mapped onto updated lower-dimensional vector representations 306, and the scatter plot 310 is updated to reflect updated positions or deletions of data points or additions of new data points. In some embodiments, these updates occur (nearly) in real time as modifications to the definitions 200 are made. For instance, a data point may shift in position as soon as the user has updated the underlying description or example prompt text. Depending on whether the updated plug-in definitions 200 solve or ameliorate the problem, and whether they cause new issues, the user 204 may revise the plug-in definitions 200 again. For example, if modifying example prompts of a first plug-in achieves disambiguation from a second plug-in, but in the course of doing so causes overlap with the example prompts of a third plug-in, the user 204 may reverse the change or try adjusting the definition of the third plug-in. These revisions continue until the user 204 is satisfied with the definitions 200 of the plug-ins being considered, e.g., because a desired level disambiguation between plug-ins has been achieved or because additional changes do not appear to result in further improvement. During the course of the revisions, the updated plug-in definitions 200 and embedding vectors 210 may be kept in temporary data storage until they are committed (e.g., by an explicit user interaction). Alternatively, the changes may be automatically propagated to the plug-in definitions database 206 and plug-in embeddings database 212; this option is feasible, in particular, if the system 300 executes in a "sandbox" environment isolated from deployed counterparts of the databases 206, 212.

In various embodiments, the modifications to the plug-in definitions may be made in the developer UI 302, a user interface of the visualization tool 308 (e.g., directly in the scatter plot 310), or some combination of both. The developer UI 302 and visualization tool 308 may include various features and/or interact in various ways to render the process of revising plug-in definitions 200 seamless and convenient. In some embodiments, the visualization tool 308 or developer UI 302 includes an analysis program function that automatically identifies data points that are likely to cause, or that have caused, collisions, and highlights these data points (e.g., by a change in size, color, or brightness, or by automatically displaying the associated text). In some embodiments, user interactions with the data points in the scatter plot 310 allow viewing and editing or deleting example prompts or plug-in descriptions. In one example, when a user 204 hovers over, clicks on, or otherwise selects a certain data point in the scatter plot, the text associated with the selected data point (e.g., the text of the corresponding user prompt, example prompt, or plug-in description) may pop up in the scatter plot 310, e.g., as an annotation to the data point. The user 204 may be able to edit the text directedly in the scatter plot 310. Alternatively, the text may be automatically pulled into the text editor of the developer UI 302, and the user 204 may edit it there. Regardless how the edits are achieved, they may be automatically propagated to the embedding model 120 for recalculation of the embedding vectors 210, and to the plug-in definitions database 206 or a temporary storage for plug-in definitions. User interactions with the data points in the scatter plot 310 may also allow deleting the point. In one example, to delete a certain example prompt, the user 204 may simply select the corresponding data point in the scatter plot 310 (e.g., by right-clicking on the data point and then choosing "delete" from a pop-up menu), which may cause the example prompt to be removed from the plug-in definition in the plug-in definitions database 206.

In some embodiments, the system 300 includes a generative AI model, such as an LLM 320, to assist with the revision of plug-in definitions. The LLM 320 may, for instance, receive an input prompt that includes example prompts from two or more plug-ins that are too close to each other in the scatter plot 310, with a request to propose revised example prompts to better differentiate between plug-ins. As another example, the LLM 320 may receive an input prompt including a user prompt that resulted in collision, along with the closest example prompts from the intended and selected plug-ins a determined from the scatter plot 310, and a request to propose new example prompts to be added for the intended plug-in to achieve a closer match in the scatter plot 310. In some embodiments, the input prompts to the LLM 320 are manually provided by the user 204, e.g., based on the user's visual identification of the problem underlying collisions. The developer UI 302 may provide a set of templates corresponding to different types or classes of problems that may be encountered (e.g., overlap between plug-ins vs. missing data points in the vicinity of a user prompt). The user 204 may choose one of these templates and populate them with the relevant prompt texts or other information, e.g., simply by selecting the relevant data points in the scatter plot 310. In other embodiments, the input prompts to the LLM 320 are generated automatically or semi-automatically. The LLM 320 or an associated machine-learning may, for instance, have image processing capabilities that allow it to determine the reasons underlying collisions automatically from the scatter plot 310, or directly based on the low-dimensional vector representations or even the high-dimensional embeddings from which they are derived. The LLM 320 may return proposed new or revised example prompts, or in some instances proposed revised plug-in definitions. The user 204 may select example prompts from among the listed proposals for testing via the computation and visualization of associated vector representations in the scatter plot 310. Alternatively, the proposed example prompts may automatically be added to the scatter plot 310 for review by the user 204. As will be apparent from the preceding elaboration, the system 300 may be configured to facilitate many different interactions between the user 204, LLM 320, plug-in definitions 200, and scatter plot 310, and to support multiple different workflows with varying degrees of automation to revise plug-in definitions 200 for reduced collisions and improved matching between user prompts and plug-ins.

Figure 7:
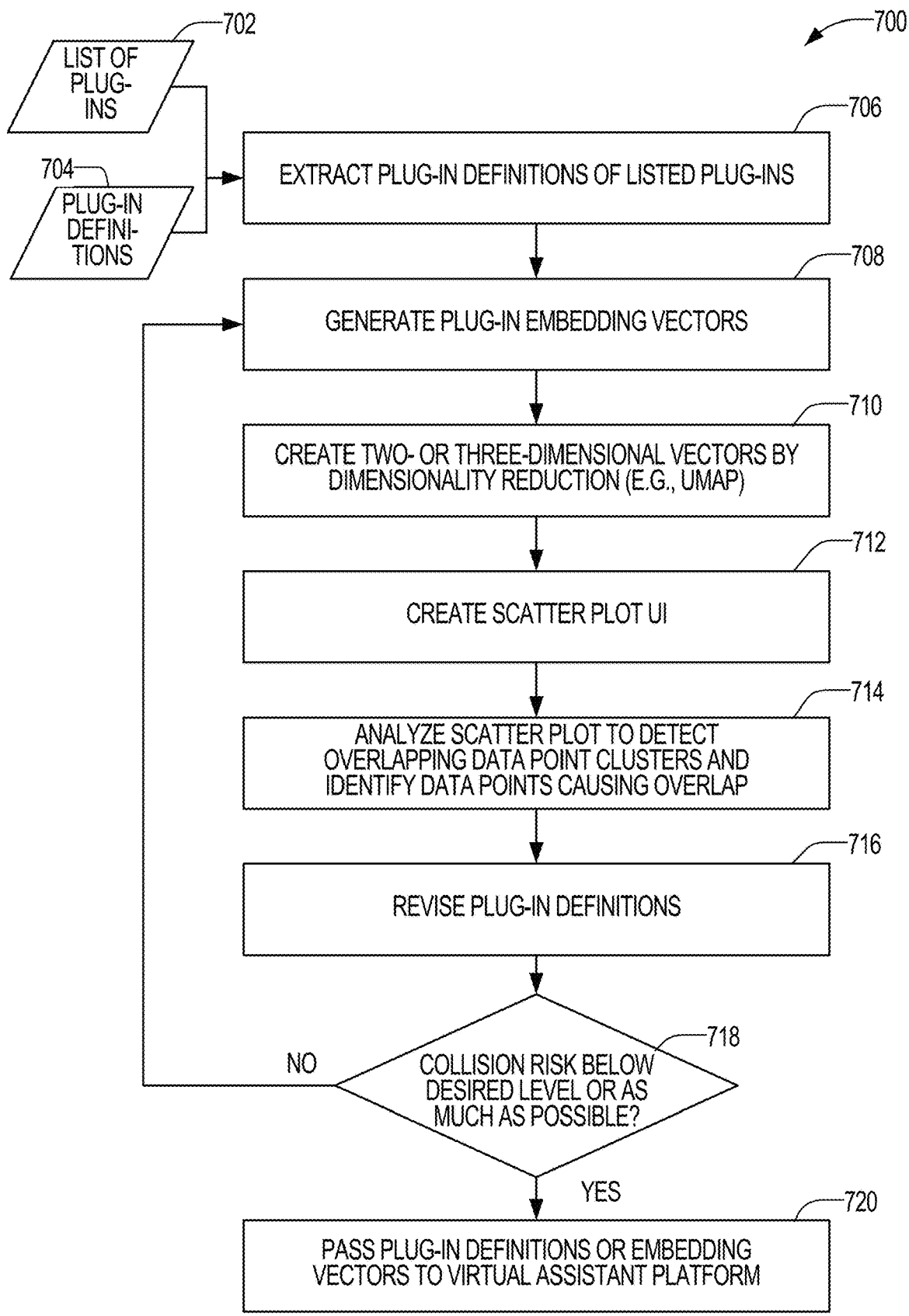
FIG. 7 is a flowchart of an example workflow for detecting collisions prior to plug-in publishing, in accordance with various embodiments.

FIG. 7 is a flowchart of an example workflow 700 for detecting collisions prior to plug-in publishing, in accordance with various embodiments. Inputs to this workflow 700 are a list 702 of plug-ins to analyze, along with a dataset 704 containing the plug-in definitions of the plug-ins available in the platform 100. The list 702 may be a small subset of the typically large number of available plug-ins, and may correspond, e.g., to the plug-ins associated with a particular application (e.g., security) or the plug-ins that have been found to be subject to a high number of prompt collisions. The workflow 700 begins at 706 with the extraction, from the dataset 704, of the plug-in definitions, e.g., the example prompts and (optionally) plug-in descriptions, of all plug-ins contained in the list 702. From the extracted example prompts and plug-in descriptions, embeddings are created at 708 by the same embedding model 120 as is used for plug-in selection in the platform 100. More specifically, an API call may be made to the embedding model endpoint to convert the natural-language example prompts and descriptions to multi-dimensional (typically high-dimensional) embedding vectors. At 710, dimension reduction is performed to convert the embedding vectors to two-dimensional (or, in some embodiments, three-dimensional) vector representations, as are suitable for visualization. In some embodiments, this data transformation is performed by a UMAP algorithm (e.g., implemented by the UMAP Python library) with parameters selected and tuned to optimize performance.

At 712, a two-dimensional (or three-dimensional) scatter plot is generated from the two-dimensional (or three-dimensional) vector representations. The scatter plot constitutes a user interface including symbolic representations of the example prompts and plug-in descriptions, each such symbolic representation being a data point whose position reflects the two-dimensional (or three-dimensional) vector representation and whose visual attributes encode the associated plug-in. In one example, generating the scatter plot involves starting the scatter plot builder within the visualization tool (e.g., using the Python library Matplotlib), setting different colors to be used for data points associated with different respective plug-ins, adding a legend to the plot that provides the name of the plug-in for each color, adding natural-language annotations over the plot (e.g., the text of the example prompt or plug-in description), and adding an "on hover" action to enable and disable the annotations over the data points.

At 714, the scatter plot is analyzed for the potential for collisions. The analysis may involve detecting plug-in-specific clusters of data points that overlap and data points within those clusters that cause the overlap. In some embodiments, the analysis is performed by a human user; in other embodiments, it is performed automatically (e.g., by an analysis program function of the visualization tool), or semi-automatically with human user input. In some embodiments, data points that cause overlap between the clusters associated with different plug-ins are automatically identified and highlighted within the scatter plot. Based on the analysis, the extracted plug-in definitions are revised at 716. Such revision may include changing the plug-in description, changing the text of one or more example prompts, adding one or more entirely new example prompts, deleting one or more example prompts, or any combination of the foregoing. As explained above with reference to FIG. 3, plug-in revisions may be performed by the human user, an LLM or other machine-learning model or computer program, or the user aided by the LLM or other model or program.

The revised plug-in definitions are fed back into the embedding model, and operations 708, 710, 712 are repeated to create an updated scatter plot, followed by the analysis of the data point clusters (714) and, if warranted, further revision of the plug-in definitions (716). The iterative process continues until the risk of collision has been reduced below a desired level or as much as possible, e.g., as assessed by the user or determined automatically based on a computed metric indicative of the risk of collisions at 718. The plug-in definitions and/or associated embedding vectors can then be passed on, at 720, to the deployed virtual assistant platform 100 for use in plug-in selection.

Figure 8:
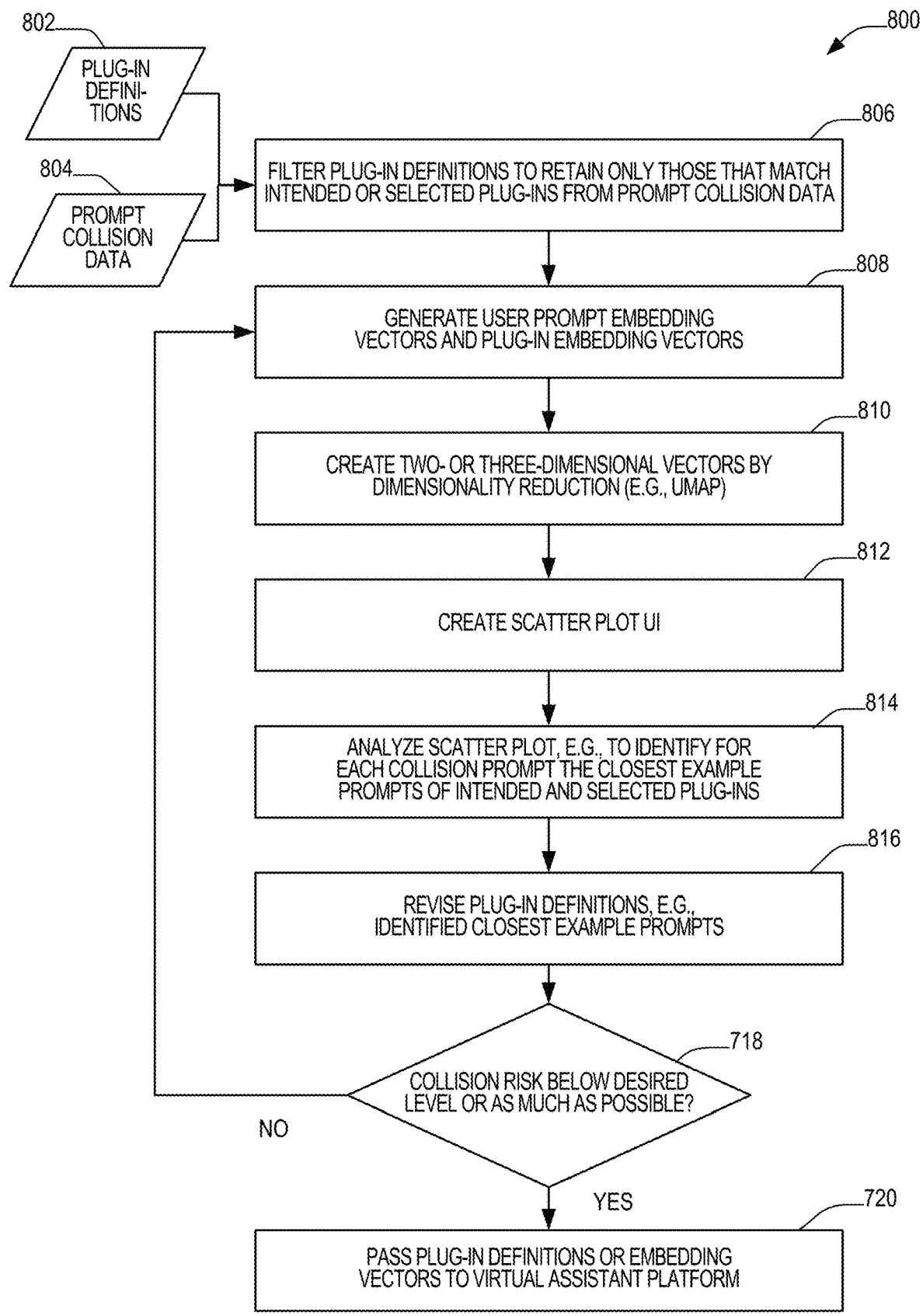
FIG. 8 is a flowchart of an example workflow for prompt collisions debugging after plug-in publishing, in accordance with various embodiments.

FIG. 8 is a flowchart of an example workflow 800 for prompt collisions debugging after plug-in publishing, in accordance with various embodiments. Inputs to this workflow 800 are a dataset 802 containing the plug-in definitions of the plug-ins available in the platform 100 and prompt collision data 804. The prompt collision data 804 may be obtained by filtering a dataset of user feedback data collected during use of the virtual assistant platform to identify instances in which an incorrect (that is, unintended) plug-in was selected, and retrieving for each such case the user prompt (e.g., a natural-language question) and the names or other identifiers of the intended and selected plug-ins. At 806, the dataset 802 of plugin definitions is filtered to retain only the definitions of plug-ins that match one of the intended or one of the selected plug-ins named in the prompt collision data 804. At 808, embeddings are created from both the user prompts in the prompt collision data 804 and the example prompts and optionally plug-in descriptions of the plug-in definitions retained in the preceding filtering operation, using the same embedding model 120 as was used for plug-in selection in the platform 100. More specifically, an API call may be made to the embedding model endpoint to convert the natural-language user prompts, example prompts, and descriptions to multi-dimensional (typically high-dimensional) plug-in embedding vectors and user prompt embedding vectors.

At 810, dimension reduction is performed to convert the embedding vectors computed from the user prompts and plug-in example prompts and descriptions to two-dimensional (or, in some embodiments, three-dimensional) vector representations. This data transformation is performed by a UMAP algorithm (e.g., implemented by the UMAP Python library) with parameters selected and tuned to optimize performance. In some embodiments, a fitted model is first generated based on the plug-in embedding vectors alone, and that model is then used to independently transform both plug-in embedding vectors and user prompt embedding vectors to the two-dimensional (or three-dimensional) vector representations.

At 812, a two-dimensional (or three-dimensional) scatter plot is generated from the two-dimensional (or three-dimensional) vector representations in a manner generally similar as described with reference to FIG. 7. However, in this case, the visual attributes of the symbolic representations, or data points, in the scatter plot encode not only the plug-ins, but also whether the data point represents a user prompt or plug-in description or example prompt. In one example, generating the scatter plot involves starting the scatter plot builder, setting different colors to be used for data points associated with different respective plug-ins, setting different shapes for data points representing user prompts (e.g., "x") versus plug-in descriptions and example prompts (e.g., dots or circles), adding a legend to the plot that provides the name of the plug-in for each color, adding natural-language annotations over the plot (e.g., the text of the user prompt, example prompt, or plug-in description), adding an "on hover" action to enable and disable the annotations over the data points, and highlighting collisions with circles surrounding data points representing the user prompts, where the color of the circle encodes the selected plug-in while the color of the data point itself encodes the intended plug-in.

At 814, the scatter plot is analyzed to determine the underlying causes for the collisions and identify the responsible data points. The analysis is performed by a human user, automatically, or semi-automatically with human user input. In some embodiments, the analysis involves determining, for each user prompt that resulted in collision, the two data points from the intended and selected plug-ins that are closest to the data point representing the user prompt. At 816, the language of the example prompts (or plug-in descriptions) associated with these two data points is amended to help solve the collision. Other ways of analyzing the scatter plot and amending plug-in descriptions (including by deleting or adding example prompts) are also possible. The amendments and other changes may be made by the user, optionally aided by an LLM or other machine-learning model or computer program that proposes language for the example prompts, or entirely automatically. The revised plug-in definitions are fed back into the embedding model, and operations 808, 810, 812 are repeated to create an updated scatter plot, followed by the analysis of the data point clusters (814) and, if warranted, further revision of the plug-in definitions (816). The iterative process continues until the risk of collision has been reduced below a desired level or as much as possible, e.g., as assessed by the user or determined automatically based on a computed metric indicative of the risk of collisions at 818. The plug-in definitions and/or associated embedding vectors can then be passed on, at 820, to the deployed virtual assistant platform 100 for use in plug-in selection.

The described systems and methods for visualizing plug-in definitions and user prompts in two- or three-dimensional plots, and updating the visualization seamlessly in response to modifications of the plug-in definitions, provides a "window" into the AI that is behind plug-in selection within the controlled environment of a virtual assistant platform. In conjunction with integrated tools for revising the plug-in definitions, including in some cases generative AI to propose or program tools to automate the modifications, the visualization can help anticipate and prevent collision problems, or debug and solve them when they occur. As a result, the quality of and confidence in plug-in selection, and of the platform at large, can be improved.

Figure 9:
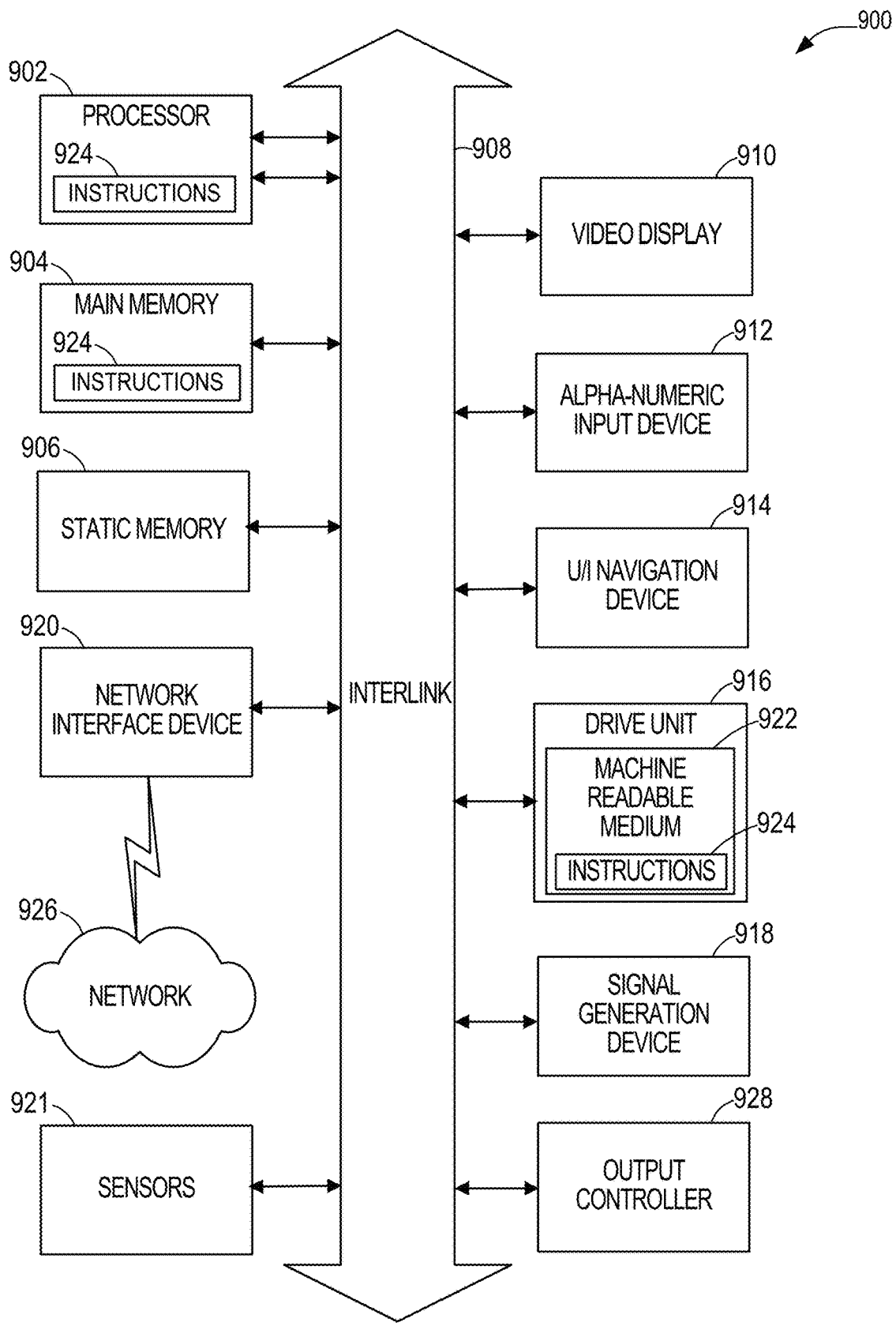
FIG. 9 is a block diagram of an example computing machine as may be used to implement the systems and methods described herein.

FIG. 9 is a block diagram of an example computing machine that may be configured to perform the computational methods described herein. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In various embodiments, machine(s) 900 may implement the computational components depicted in FIGS. 1-3, and may perform one or more of the processes described above with respect to FIGS. 7 and 8.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine-readable medium 922 on which are stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that are not a transitory propagating signal.

The instructions 924 may further be transmitted or received over a communications network 926 using a transmission medium via the network interface device 920. The machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

1. A method for improving plug-in selection in a virtual assistant platform is provided. The method includes performing operations by one or more processors of a computing system. These operations include: receiving plug-in definitions for a plurality of plug-ins, the plug-in definitions comprising example prompts associated with the plug-ins; generating high-dimensional embedding vectors for the example prompts with an embedding model also used for plug-in selection in the virtual assistant platform; mapping the high-dimensional embedding vectors to two- or three-dimensional vector representations of the example prompts; generating, for display to a user, a user interface comprising data points representing the example prompts, wherein positions of the data points reflect the two- or three-dimensional vector representations and wherein visual attributes of the data points encode associated plug-ins; receiving a modification to the plug-in definitions, the modification comprising at least one of: deletion of at least one of the example prompts, a modification of at least one of the example prompts, or addition of at least one new example prompt to a plug-in definition for one of the plurality of plug-ins; generating at least one updated high-dimensional embedding vector of the example prompts based on the modification; mapping the at least one updated high-dimensional embedding vector to at least one updated two- or three-dimensional vector representation; and updating the position of at least one of the data points in the user interface based on the at least one updated two- or three-dimensional vector representations.

2. In the method of example 1, the mapping is performed with a UMAP algorithm.

3 The method of example 1 or example 2 further includes passing the modification to the plug-in definition and/or the updated high-dimensional embedding vector to the virtual assistant platform for use in plug-in selection.

4. In the method of any of examples 1-3, the data points in the user interface are spatially grouped into multiple clusters, each cluster being associated with one of the plug-ins. The modification to the plug-in definitions includes a deletion or modification of an example prompt represented by a data point that contributes to overlap between two clusters associated with different respective plug-ins.

5. In the method of example 5, the operations further include automatically identifying the data point that contributes to the overlap.

6. The method of any of examples 1-5 further includes displaying, in association with at least one of the data points in the user interface, an annotation comprising the example prompt that the data point represents.
7. In the method of example 6, receiving the modification to the plug-in definitions involves receiving, in the user interface, user input modifying the annotation.
8. In the method of any of examples 1-5, the modification to the plug-in definitions comprises the deletion of at least one of the example prompts responsive to user input in the user interface that selects the at least one data point representing the at least one example prompt for deletion.
9. In the method of any of examples 1-8, receiving a modification to the plug-in definitions involves receiving a modification to at least one of the example prompts from an LLM operating on the example prompt.
10. A computer-readable medium stores machine-readable instructions which, when executed by one or more computer processors, cause the computer processor(s) to perform the method of any of examples 1-9.
11. A computer system includes one or more computer processors and one or more computer-readable media that store machine-readable instructions which, when executed by the computer processor(s), cause the computer processor(s) to perform the method of any of examples 1-9.
12. A method for debugging prompt collisions detected during plug-in selection in a virtual assistant platform is provided. The method includes performing, by one or more processors of a computing system, operations comprising: receiving prompt collision data comprising a user prompt that caused a prompt collision in the virtual assistant platform, a first plug-in identifier associated with a plug-in that was selected responsive to the user prompt, and a second plug-in identifier associated with a plug-in that was intended by the user prompt; creating, from plug-in definitions for a plurality of plug-ins, a filtered set of plug-in definitions that includes plug-in definitions of plug-ins whose associated plug-in identifier matches the first or second plug-in identifiers, the plug-in definitions in the filtered set comprising example prompts associated with the plug-ins; generating, with an embedding model also used for plug-in selection in the virtual assistant platform, high-dimensional embedding vectors for the example prompts in the filtered set of plug-in definitions and for the user prompt; mapping the high-dimensional embedding vectors to two- or three-dimensional vector representations of the example prompts and the user prompt; generating, for display to a user, a user interface comprising data points representing the example prompts and the user prompt, wherein positions of the data points reflect the two- or three-dimensional vector representations and wherein visual attributes of the data points encode associated plug-ins and differ between the example prompts and the user prompt; receiving a modification to the plug-in definitions in the filtered set, the modification comprising at least one of: deletion of at least one of the example prompts, a modification of at least one of the example prompts, or addition of at least one new example prompt to one of the plug-in definitions in the filtered set; generating at least one updated high-dimensional embedding vector of the example prompts based on the modification; mapping the at least one updated high-dimensional embedding vector to at least one updated two- or three-dimensional vector representation; and updating the position of at least one of the data points in the user interface based on the at least one updated two- or three-dimensional vector representations.
13. In the method of example 12, the mapping is performed with a UMAP algorithm.
14. The method of example 12 or example 13 further includes passing the modification to the plug-in definitions and/or the at least one updated high-dimensional embedding vector to the virtual assistant platform for use in plug-in selection.
15. In the method of any of examples 12-14, the modification to the plug-in definitions comprises a modification of an example prompt represented by a data point selected among: a first data point that is closest, among data points associated with the plug-in that was selected responsive to the user prompt, to a data point representing the user prompt, and a second data point that is closest, among data points associated with the plug-in that was intended by the user prompt, to the data point representing the user prompt.
16. The method of example 13, further comprising automatically identifying the first and second data points.
17. The method of any of examples 12-16, further comprising displaying, in association with at least one of the data points in the user interface, an annotation comprising the example prompt that the data point represents.
18. In the method of example 17, receiving the modification to the plug-in definitions comprises receiving, in the user interface, user input modifying the annotation.
19. In the method of any of examples 12-18, receiving a modification to the plug-in definitions comprises receiving a modification to at least one of the example prompts from an LLM operating on the example prompt.
20. A computer-readable medium stores machine-readable instructions which, when executed by one or more computer processors, cause the computer processor(s) to perform the method of any of examples 12-19.
21. A computer system includes one or more computer processors and one or more computer-readable media that store machine-readable instructions which, when executed by the computer processor(s), cause the computer processor(s) to perform the method of any of examples 12-19.
22. A computing system for improving plug-in selection in a virtual assistant platform is provided. The computing system includes: a user interface configured to receive plug-in definitions for a plurality of plug-ins, the plug-in definitions comprising example prompts associated with the plug-ins; an embedding model configured to operate on the example prompts to generate high-dimensional embedding vectors for the example prompts, the embedding model also used for plug-in selection in the virtual assistant platform; a dimension reduction module configured to map the high-dimensional embedding vectors to two- or three-dimensional vector representations of the example prompts; and a visualization tool configured to generate, for display to a user, a user interface comprising data points representing the example prompts, wherein positions of the data points reflect the two- or three-dimensional vector representations and wherein visual attributes of the data points encode associated plug-ins.

The modifications to the plug-in definitions cause generation of updated high-dimensional embedding vectors, mapping of the updated high-dimensional embedding vectors to updated two- or three-dimensional vector representations, and updates to the positions of the data points in the user interface reflecting the updated two- or three-dimensional vector representations.

23. In the system of example 22, the dimension reduction module implements a UMAP algorithm.

24. In the system of example 22 or example 23, the visualization tool is further configured to cause display, in association with at least one of the data points in the user interface, of an annotation comprising the example prompt that the data point represents.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense.

What is claimed is:

1. A method for improving plug-in selection in a virtual assistant platform, the method comprising performing, by one or more processors of a computing system, operations comprising:
   receiving plug-in definitions for a plurality of plug-ins, the plug-in definitions comprising example prompts associated with the plug-ins;
   generating high-dimensional embedding vectors for the example prompts with an embedding model also used for plug-in selection in the virtual assistant platform;
   mapping the high-dimensional embedding vectors to two- or three-dimensional vector representations of the example prompts;
   generating, for display to a user, a user interface comprising data points representing the example prompts, wherein positions of the data points reflect the two- or three-dimensional vector representations and wherein visual attributes of the data points encode associated plug-ins;
   receiving a modification to the plug-in definitions, the modification comprising at least one of: deletion of at least one of the example prompts, a modification of at least one of the example prompts, or addition of at least one new example prompt to a plug-in definition for one of the plurality of plug-ins;
   generating at least one updated high-dimensional embedding vector of the example prompts based on the modification;
   mapping the at least one updated high-dimensional embedding vector to at least one updated two- or three-dimensional vector representation; and
   updating the position of at least one of the data points in the user interface based on the at least one updated two- or three-dimensional vector representations.

2. The method of claim 1, wherein the mapping is performed with a Uniform Manifold Approximation and Projection (UMAP) algorithm.

3. The method of claim 1, wherein the operations further comprise passing at least one of (i) the modification to the plug-in definitions or (ii) the at least one updated high-dimensional embedding vector to the virtual assistant platform for use in plug-in selection.

4. The method of claim 1, wherein the data points in the user interface are spatially grouped into multiple clusters, each cluster associated with one of the plug-ins, and wherein the modification to the plug-in definitions comprises a deletion or modification of an example prompt represented by a data point that contributes to overlap between two clusters associated with different respective plug-ins.

5. The method of claim 4, wherein the operations further comprise automatically identifying the data point that contributes to the overlap.

6. The method of claim 1, wherein the operations further comprise displaying, in association with at least one of the data points in the user interface, an annotation comprising the example prompt that the data point represents.

7. The method of claim 6, wherein receiving the modification to the plug-in definitions comprises receiving, in the user interface, user input modifying the annotation.

8. The method of claim 1, wherein the modification to the plug-in definitions comprises the deletion of at least one of the example prompts responsive to user input in the user interface that selects the at least one data point representing the at least one example prompt for deletion.

9. The method of claim 1, wherein receiving a modification to the plug-in definitions comprises receiving a modification to at least one of the example prompts from a large language model (LLM) operating on the example prompt.

10. A method for debugging prompt collisions detected during plug-in selection in a virtual assistant platform, the method comprising performing, by one or more processors of a computing system, operations comprising:
   receiving prompt collision data comprising a user prompt that caused a prompt collision in the virtual assistant platform, a first plug-in identifier associated with a plug-in that was selected responsive to the user prompt, and a second plug-in identifier associated with a plug-in that was intended by the user prompt;
   creating, from plug-in definitions for a plurality of plug-ins, a filtered set of plug-in definitions that includes plug-in definitions of plug-ins whose associated plug-in identifier matches the first or second plug-in identifiers, the plug-in definitions in the filtered set comprising example prompts associated with the plug-ins;
   generating, with an embedding model also used for plug-in selection in the virtual assistant platform, high-dimensional embedding vectors for the example prompts in the filtered set of plug-in definitions and for the user prompt;
   mapping the high-dimensional embedding vectors to two- or three-dimensional vector representations of the example prompts and the user prompt;
   generating, for display to a user, a user interface comprising data points representing the example prompts and the user prompt, wherein positions of the data points reflect the two- or three-dimensional vector representations and wherein visual attributes of the data points encode associated plug-ins and differ between the example prompts and the user prompt;
   receiving a modification to the plug-in definitions in the filtered set, the modification comprising at least one of: deletion of at least one of the example prompts, a modification of at least one of the example prompts, or addition of at least one new example prompt to one of the plug-in definitions in the filtered set;
   generating at least one updated high-dimensional embedding vector of the example prompts based on the modification;
   mapping the at least one updated high-dimensional embedding vector to at least one updated two- or three-dimensional vector representation; and updating the position of at least one of the data points in the user interface based on the at least one updated two- or three-dimensional vector representations.

11. The method of claim 10, wherein the mapping is performed with a Uniform Manifold Approximation and Projection (UMAP) algorithm.

12. The method of claim 10, wherein the operations further comprise passing at least one of (i) the modification to the plug-in definitions or (ii) the at least one updated high-dimensional embedding vector to the virtual assistant platform for use in plug-in selection.

13. The method of claim 10, wherein the modification to the plug-in definitions comprises a modification of an example prompt represented by a data point selected among: a first data point that is closest, among data points associated with the plug-in that was selected responsive to the user prompt, to a data point representing the user prompt, and a second data point that is closest, among data points associated with the plug-in that was intended by the user prompt, to the data point representing the user prompt.

14. The method of claim 13, wherein the operations further comprise automatically identifying the first and second data points.

15. The method of claim 10, wherein the operations further comprise displaying, in association with at least one of the data points in the user interface, an annotation comprising the example prompt that the data point represents.

16. The method of claim 15, wherein receiving the modification to the plug-in definitions comprises receiving, in the user interface, user input modifying the annotation.

17. The method of claim 10, wherein receiving a modification to the plug-in definitions comprises receiving a modification to at least one of the example prompts from a large language model (LLM) operating on the example prompt.

18. A computing system for improving plug-in selection in a virtual assistant platform, the computing system comprising:
a user interface configured to receive plug-in definitions for a plurality of plug-ins, the plug-in definitions comprising example prompts associated with the plug-ins;
an embedding model configured to operate on the example prompts to generate high-dimensional embedding vectors for the example prompts, the embedding model also used for plug-in selection in the virtual assistant platform;
a dimension reduction module configured to map the high-dimensional embedding vectors to two- or three-dimensional vector representations of the example prompts; and
a visualization tool configured to generate, for display to a user, a user interface comprising data points representing the example prompts, wherein positions of the data points reflect the two- or three-dimensional vector representations and wherein visual attributes of the data points encode associated plug-ins,
wherein modifications to the plug-in definitions cause generation of updated high-dimensional embedding vectors, mapping of the updated high-dimensional embedding vectors to updated two- or three-dimensional vector representations, and updates to the positions of the data points in the user interface reflecting the updated two- or three-dimensional vector representations.

19. The computing system of claim 18, wherein the dimension reduction module implements a Uniform Manifold Approximation and Projection (UMAP) algorithm.

20. The computing system of claim 18, wherein the visualization tool is further configured to cause display, in association with at least one of the data points in the user interface, of an annotation comprising the example prompt that the data point represents.

* * * * *